United States Patent
Lin

(10) Patent No.: US 8,751,824 B2
(45) Date of Patent: Jun. 10, 2014

(54) METHOD AND APPARATUS FOR PROTECTING SOFTWARE OF MOBILE TERMINAL

(75) Inventor: Hua Lin, Shenzhen (CN)

(73) Assignee: ZTE Corporation, Shenzhen (CN)

(*) Notice: Subject to any disclaimer, the term of this patent is extended or adjusted under 35 U.S.C. 154(b) by 13 days.

(21) Appl. No.: 13/640,558

(22) PCT Filed: Dec. 8, 2010

(86) PCT No.: PCT/CN2010/079579
§ 371 (c)(1), (2), (4) Date: Oct. 11, 2012

(87) PCT Pub. No.: WO2012/048493
PCT Pub. Date: Apr. 19, 2012

(65) Prior Publication Data
US 2013/0031375 A1  Jan. 31, 2013

(30) Foreign Application Priority Data
Oct. 14, 2010  (CN) .......................... 2010 1 0509953

(51) Int. Cl.
G06F 21/00 (2013.01)
G06F 21/76 (2013.01)
G06F 21/72 (2013.01)
G06F 21/44 (2013.01)

(52) U.S. Cl.
CPC ............... *G06F 21/76* (2013.01); *G06F 21/72* (2013.01); *G06F 21/44* (2013.01)
USPC ............................................. 713/192; 713/2

(58) Field of Classification Search
CPC .......... G06F 21/76; G06F 21/72; G06F 21/44
USPC ...................................... 713/2, 192
See application file for complete search history.

(56) References Cited

U.S. PATENT DOCUMENTS

| 7,490,350 B1 | 2/2009 | Murotake |
| 2004/0078634 A1* | 4/2004 | Gilstrap et al. ............ 714/5 |

(Continued)

FOREIGN PATENT DOCUMENTS

| CN | 1553729 A | 12/2004 |
| CN | 1913680 A | 2/2007 |

(Continued)

OTHER PUBLICATIONS

International Search Report in international application No. PCT/CN2010/079579, mailed on Jul. 21, 2011.
English Translation of the Written Opinion of the International Search Authority in international application No. PCT/CN2010/079579, mailed on Jul. 21, 2011.
The GPIO of TMS320VC5402 and Its Application, Aug. 30, 2003.

*Primary Examiner* — Kambiz Zand
*Assistant Examiner* — Michael Guirguis
(74) *Attorney, Agent, or Firm* — Oppendahl Patent Law Firm LLC

(57) ABSTRACT

A method for protecting software of a mobile terminal is provided in the disclosure, wherein an encryption chip is mounted in the mobile terminal. The method includes: when the mobile terminal is turned on, whether or not the encryption chip is invalid is detected; when it is not invalid, the encryption chip authenticates the software of the mobile terminal through interaction with a main chip; when the authentication is not passed, the encryption chip controls a functional module of the mobile terminal through a hardware protection circuit. An apparatus for protecting software of a mobile terminal is also provided in the present disclosure. The solution of the disclosure can prevent the software of the mobile terminal from being cracked and protect the functions of the mobile terminal from illegal usage, thus the security of the mobile terminal is greatly improved and the interests of operators and manufacturers are protected.

18 Claims, 3 Drawing Sheets

(56) References Cited

U.S. PATENT DOCUMENTS

| | | | |
|---|---|---|---|
| 2006/0143446 A1* | 6/2006 | Frank et al. | 713/164 |
| 2007/0101156 A1* | 5/2007 | Novoa et al. | 713/190 |
| 2008/0077994 A1* | 3/2008 | Comlekoglu | 726/27 |
| 2010/0005313 A1* | 1/2010 | Dai | 713/185 |

FOREIGN PATENT DOCUMENTS

| | | |
|---|---|---|
| CN | 101098540 A | 1/2008 |
| CN | 101541002 A | 9/2009 |
| CN | 101777106 A | 7/2010 |
| KR | 1020070080058 A | 8/2007 |

* cited by examiner

METHOD AND APPARATUS FOR PROTECTING SOFTWARE OF MOBILE TERMINAL

TECHNICAL FIELD

The disclosure relates to a security technology for a mobile terminal, particularly to a method and an apparatus for protecting software of a mobile terminal.

BACKGROUND

At present, mobile phones have become indispensable tools in the daily life of most people with the rapid development of the mobile terminal market. Most mobile phone manufacturers and operators have applied software protection to protect their own interests and enable mobile phone users to use certain services or networks in a period of time.

Currently, mobile phone manufacturers mainly employ software for encryption program encryption is carried out using an encryption algorithm similar to MD5 (the fifth version of Message-Digest Algorithm), which consumes more resources because encryption and decryption are involved each time. Another common method is to combine encryption with a platform, that is, encrypt the chip ID of a main chip bound with the chip ID of a Flash to obtain a ciphertext and save the ciphertext in the Flash, and verify the ciphertext each time a mobile phone is turned on. However, dangers, such as easily hacked, and leakage of secret keys, may exist in this method.

Generally, a hacker cracks a mobile phone by illegally downloading new mobile phone software. Algorithms have bugs no matter how powerful they are. Therefore, if a hacker utilizes program bugs to get around or damage original software and directly download new mobile phone software and updates programs in a Flash, then it is meaningless to establish algorithms, no matter how powerful they are, in mobile software; such case happens occasionally.

SUMMARY

In view of this, the main purpose of the disclosure is to provide a method and an apparatus for protecting software of a mobile terminal to prevent the software of the mobile terminal from being cracked, thus the security of the mobile terminal is greatly improved and the interests of operators and manufacturers are protected.

To achieve the purpose above, the technical solution of the disclosure is realized as follows.

A method for protecting software of a mobile terminal is provided in the disclosure, including: mounting an encryption chip in the mobile terminal, and further including:

when the mobile terminal is turned on, detecting whether or not the encryption chip is invalid;

when the encryption chip is not invalid, authenticating, by the encryption chip, the software of the mobile terminal through interaction with a main chip; and when the authentication is not passed, controlling, by the encryption chip, a functional module of the mobile terminal through a hardware protection circuit.

In the solution above, the detecting whether or not the encryption chip is invalid may include: determining, by the main chip, whether or not the encryption chip is invalid according to whether or not information sent by the encryption chip is received in a set period of time; if the information is received, determining that the encryption chip is not invalid; otherwise, determining that the encryption chip is invalid;

or reading, by the main chip, a status of a General Purpose Input Output (GPIO) interface of the encryption chip, and determining, by the main chip, whether or not the encryption chip is invalid; when the status of the GPIO interface changes according to a preset period, determining that the encryption chip is not invalid; when the status of the GPIO interface does not change according to a preset period, determining that the encryption chip is invalid;

or determining, by the main chip, whether or not the encryption chip is invalid according to whether or not a secret key configured to authenticate the software of the mobile terminal is received in a set period of time is received; if the secret key is received, then determining that the encryption chip is not invalid; otherwise, determining that the encryption chip is invalid.

In the solution above, the authenticating, by the encryption chip, the software of the mobile terminal through interaction with a main chip may include: sending, by the encryption chip, a secret key configured to authenticate the software of the mobile terminal to the main chip; after the main chip receives said secret key, searching, by the main chip, a secret key matched with said secret key in the main chip itself; returning, by the main chip, the matched secret key or an authentication passed message to the encryption chip when a secret key matched with said secret key is found; and returning, by the main chip, an authentication failure message or not returning the matched secret key to the encryption chip when the secret key matched with said secret key is not found or not searched;

when the encryption chip receives the authentication failure message or does not receive the matched secret key in a set period of time, then indicating that the authentication is not passed; when the encryption chip receives the authentication passed message or the matched secret key, then indicating that the authentication is passed; wherein the secret key configured to authenticate the software of the mobile terminal and the secret key matched with said secret key are secret keys matched with each other and are respectively preset by a computer in the encryption chip and in the main chip;

or reading, by the encryption chip, a status of a GPIO interface of the main chip; when the status of the GPIO interface changes according to a preset period, then indicating that the authentication is passed; when the status of the GPIO interface does not change according to the preset period, then indicating that the authentication is not passed.

In the solution above, the controlling, by the encryption chip, a functional module of the mobile terminal through a hardware protection circuit may include: controlling, by the encryption chip, an analog switch in the hardware protection circuit through a control line to turn off a Flash, and/or lock a keyboard, and/or turn off a Liquid Crystal Display (LCD), and/or turn off an audio function, and/or turn off a Subscriber Identity Module (SIM) card access.

In the solution above, the method may further include: when the encryption chip is detected to be invalid, protecting and controlling the functional module of the mobile terminal through software.

In the solution above, the protecting and controlling the functional module of the mobile terminal through software may include: turning off, by the main chip of the mobile terminal, a network service port, and/or an LCD port, and/or a audio functional port, and/or a keyboard response port through the software of the mobile terminal.

In the solution above, the method may further include: setting a timer in the encryption chip; starting timing again each time the timer times out; and detecting again whether or not the encryption chip is invalid and authenticating the software of the mobile terminal again.

The disclosure provides an apparatus for protecting software of a mobile terminal, including: a main chip of the mobile terminal, an encryption chip and a hardware protection circuit; wherein the main chip of the mobile terminal is configured to, when the mobile terminal is turned on, detect whether or not the encryption chip is invalid, interact with the encryption chip when the encryption chip is not invalid, and authenticate the software of the mobile terminal;

the encryption chip is configured to interact with the main chip of the mobile terminal, authenticate the software of the mobile terminal, and notify the hardware protection circuit to control a functional module of the mobile terminal when the authentication is not passed; and the hardware protection circuit is configured to, according to the notification from the encryption chip, control the functional module of the mobile terminal.

In the solution above, the encryption chip may be configured to send a secret key configured to authenticate the software of the mobile terminal to the main chip of the mobile terminal; wherein when the encryption chip, in a set period of time, receives an authentication failure message or does not receive a matched secret key sent by the main chip of the mobile terminal, it indicates that the authentication is not passed; when the encryption chip receives an authentication passed message or the matched secret key, it indicates that the authentication is passed.

Accordingly, the main chip of the mobile terminal may be further configured to, after receiving said secret key configured to authenticate the software of the mobile terminal from the encryption chip, search a secret key matched with said secret key in the main chip itself; return the matched secret key or an authentication passed message to the encryption chip when the secret key matched with said secret key is found; and return an authentication failure message or not return the matched secret key to the encryption chip when the secret key matched with said secret key is not found or not searched.

Accordingly, the apparatus may further include a computer configured to set secret keys matched with each other in the encryption chip and in the main chip of the mobile terminal, respectively;

or, the encryption chip may be configured to read a status of a GPIO interface of the encryption chip; wherein when the status of the GPIO interface changes according to a preset period, it indicates that the authentication is passed; when the status of the GPIO interface does not change according to the preset period, it indicates that the authentication is not passed;

accordingly, the main chip of the mobile terminal may be further configured to preset a changing period of the status of the GPIO interface, and sets its own GPIO high or low according to the period.

In the solution above, the hardware protection circuit may include a control line and an analog switch; wherein the analog switch is set on a signal line of the functional module of the mobile terminal; and the control line is configured to transmit a control signal which is used by the encryption chip to control the analog switch; and the functional module of the mobile terminal may include: a Flash, and/or an LCD module, and/or a keyboard module, and/or an audio module, and/or an SIM card module.

In the solution above, the main chip of the mobile terminal may be further configured to, when the encryption chip is detected to be invalid, protect and control the functional module of the mobile terminal through software;

wherein the protecting and controlling the functional module of the mobile terminal through software includes: turning off a network service port, and/or an LCD port, and/or an audio functional port, and/or a keyboard response port through the software of the mobile terminal.

A method and an apparatus for protecting software of a mobile terminal are provided in the disclosure. An encryption chip is mounted in the mobile terminal. When the mobile terminal is turned on, whether or not the encryption chip is invalid is detected; when it is not invalid, the encryption chip authenticates the software of the mobile terminal through interaction with a main chip; when the authentication is not passed, the encryption chip controls a functional module of the mobile terminal through a hardware protection circuit. In this way, the software of the mobile terminal can be prevented from being cracked and the functions of the mobile terminal can be protected from illegal usage, thus the security of the mobile terminal is greatly improved and the interests of operators and manufacturers are protected.

DETAILED DESCRIPTION

The basic idea of the disclosure is that: an encryption chip is mounted in a mobile terminal; when the mobile terminal is turned on, whether or not the encryption chip is invalid is detected; when it is not invalid, the encryption chip authenticates software of the mobile terminal through interaction with a main chip; when the authentication is not passed, the encryption chip controls a functional module of the mobile terminal through a hardware protection circuit.

The encryption chip supports online writing and multiple programming, and is provided with at least one communication interface and one control interface. Generally, a 51 core-based chip, or a Peripheral Interface Controller (PIC) chip and etc. can be employed as an encryption chip. A special tool is required to write the writeable area of the encryption chip. The communication interface is configured to communicate with the main chip of the mobile terminal. The control interface is configured to connect the hardware protection circuit.

The disclosure is described in details according to the accompanying drawings and specific embodiments as below.

Figure 1:
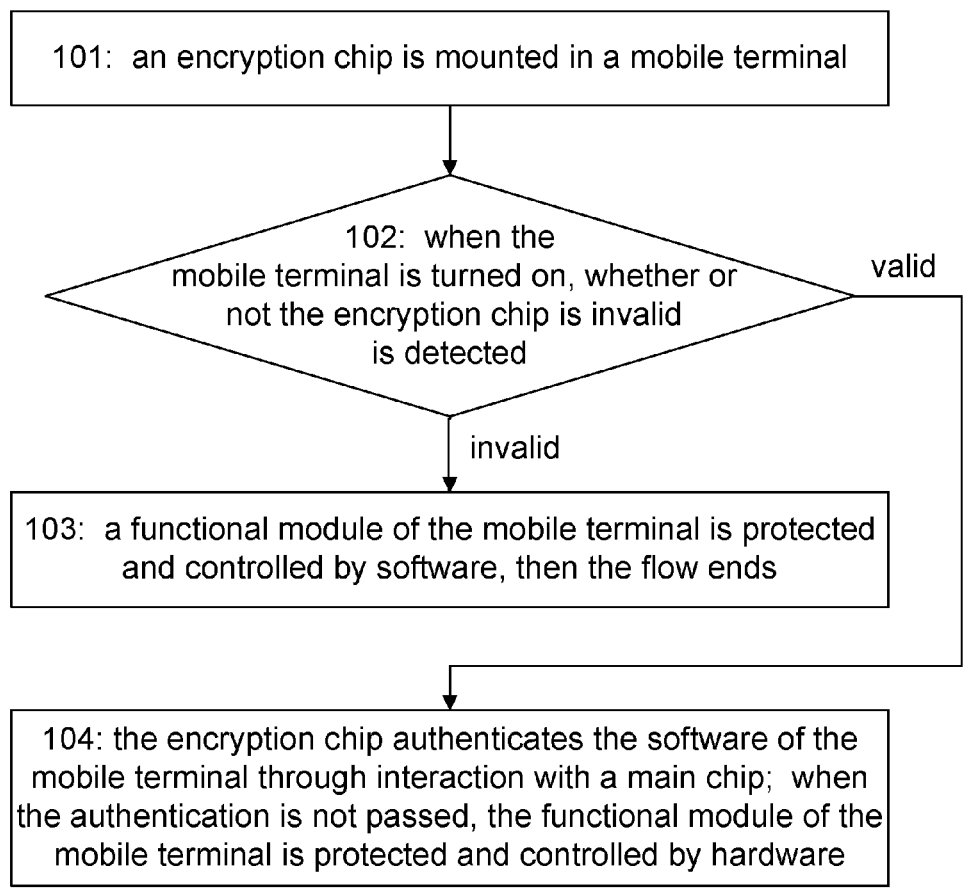
FIG. 1 is a flowchart of realization of a method for protecting software of a mobile terminal in the disclosure.

The method for protecting software of a mobile terminal in the disclosure is as shown in FIG. 1. The method includes the following steps.

Figure 2:
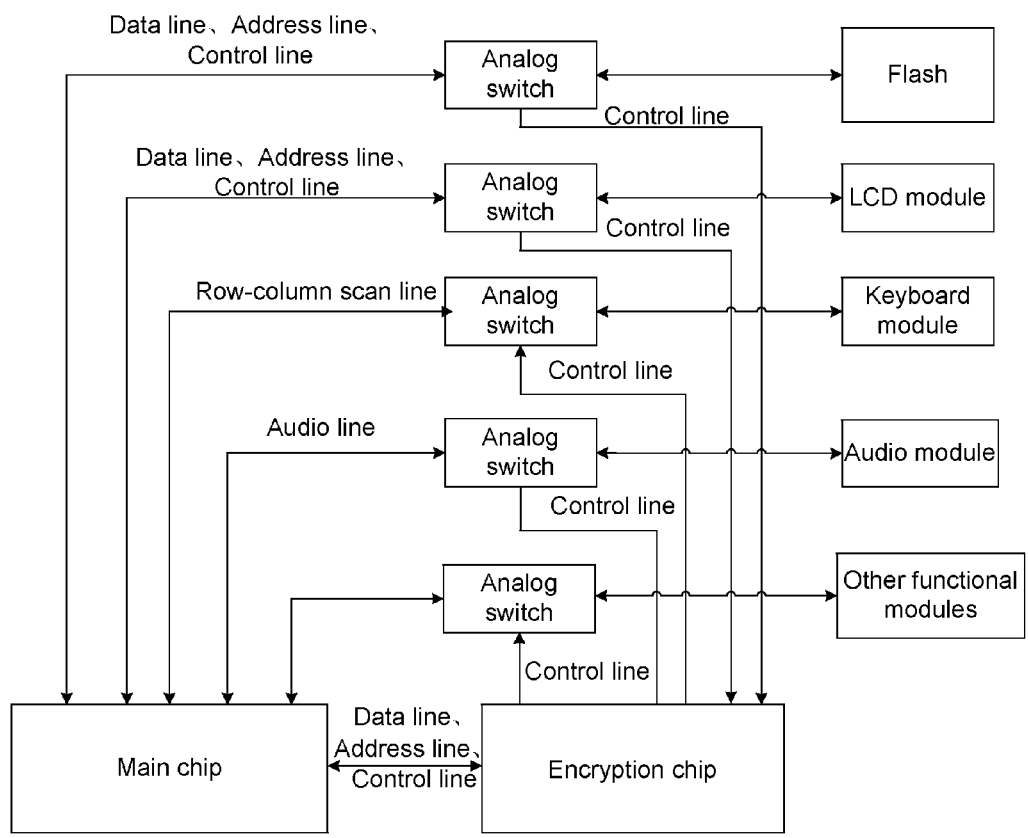
FIG. 2 is a schematic diagram illustrating connections in a hardware protection circuit of the disclosure.

Step 101: an encryption chip is mounted in the mobile terminal;

specifically, in the mobile terminal, a chip where the software of the mobile terminal is located is the main chip. The encryption chip is connected with the main chip of the mobile terminal through an existing interface on the mobile terminal. Communication modes, which apply GPIO, Inter-Integrated Circuit (I2C), parallel interfaces and serial interfaces, and etc., are utilized for interaction between the main chip and the encryption chip. Information in the encryption chip cannot be modified by the main chip, and an interface of the encryption chip is connected to a computer. The interface can be a serial interface or other interfaces, through which the computer writes a corresponding secret key into the encryption chip. In order to facilitate production, the interface can apply a test point method, and a hardware protection circuit needs to be set for the encryption chip. As shown in FIG. 2, the functional modules of the mobile terminal, such as a Flash, an LCD module, a keyboard module, an audio module and an SIM card module, and etc., are connected with the main chip of the mobile terminal through signal lines respectively. An analog switch is set on a key signal line of each functional module and the analog switch is turned on or turned off by the encryption chip using a control line, thus realizing on-off control of the functional modules of the mobile terminal and protecting functions of the mobile terminal. The signal line includes a power line, a data line, an address line, a control line, a row-column scan line, and an audio line, etc. The control line is configured to transmit a control signal which is used by the encryption chip to control the analog switch.

Specifically, for the Flash, an analog switch is added on the power line of the Flash. When the authentication performed by the encryption chip on the software of the mobile terminal is not passed, the power supply of the Flash can be cut off by the analog switch to make the mobile terminal invalid. Generally, the analog switch can apply a triode. The LCD module is controlled as the same as the Flash, and it is only needed to control the power source of the LCD module through an analog switch. Of course, a data line or an address line of the LCD module can be controlled by a module switch. When the authentication performed by the encryption chip on the software of the mobile terminal is not passed, the data line or the address line of the LCD module can be cut off through the analog switch or the module switch, to make the LCD module invalid. The method for controlling the keyboard module is the same. When there is a full-keyboard chip, when the authentication performed by the encryption chip on the software of the mobile terminal is not passed, a full-keyboard chip can be stopped working only by cutting off the power source of the full-keyboard chip through an analog switch, or a control can be realized only by cutting off part of row-column scan lines of the full-keyboard chip through an analog switch. A method of controlling the audio module can be that an analog switch is added to an audio line, a SPEAKER, a RECEIVER and an MIC signal line connected with the main chip of the mobile terminal, and on-off control can be realized by the analog switch. For the SIM card module, it is only needed to add an analog switch on a clock line or a data line of the SIM card module, thus the encryption chip can disconnect the data line through an analog switch to make the SIM card function invalid. The method of adding an analog switch as described above can be applied to other functional modules of the mobile terminal, and the encryption chip can control each functional module of the mobile terminal by controlling analog switches, so as to protect the hardware.

Further, matched secret keys can be set in the encryption chip and in the main chip by the computer respectively to perform interactive authentication on the software of the mobile terminal.

In the step that matched secret keys are set in the encryption chip and in the main chip respectively; a Flash ID, and/or an International Mobile Equipment Identity (IMEI), and/or an encryption chip serial number, and etc. can be read by the computer, and the Flash ID, and/or the IMEI, and/or the encryption chip serial number, and etc. can be combined to produce "one computer one code" secret keys. The produced secret keys are saved in the encryption chip and in the main chip of the mobile terminal respectively, as matched secret keys for communication handshaking. Generally, the Flash ID, and/or the IMEI, and/or the encryption chip serial number, and etc. are combined by addition processing, or exclusive-or processing;

or the computer sets a Triple DES (TDES) algorithm to be applied between the encryption chip and the mobile terminal, and predetermines a 16-byte authentication key and saves the key in the encryption chip and the mobile terminal respectively. When the encryption chip sends the secret key configured to authenticate the software of the mobile terminal, the following steps are performed:

encryption operation: perform 3DES operation on KEY and a random number (RAND) to obtain an eight-byte result R, i.e. R=KEY⊕RAND, form command data (CHV value): CHV value=R; sending a verification command and the RAND: sending a verification command (a0 20 00 01 08 R) and the RAND to the mobile terminal;

when the mobile terminal obtains the verification command and the RAND, the following steps are performed:

decryption operation: perform 3DES decryption operation ON the KEY and the R to obtain an eight-byte result RN, i.e. RN=Key⊕R, the obtained RN is a decryption result; matching operation: RAND=RN, indicating it is correct, and returning SW1SW2="authentication passed", otherwise, returning SW1SW2="authentication not passed", or not returning a value in a predetermined period of time;

further, before the computer reads the Flash ID, and/or the IMEI, and/or the encryption chip serial number, and etc. or sets application of the TDES algorithm, the computer needs to perform softdog authentication, and after the authentication is passed, the computer reads the Flash ID, and/or the IMEI, and/or the encryption chip serial number, and etc. or set the TDES algorithm to be applied.

In this step, since the software of the mobile terminal may be cracked, it should be ensured that a circuit module of the encryption chip can work normally and the hardware protection circuit can be started when the software of the mobile terminal is cracked. Therefore, this step further includes selecting a power source for the encryption chip. The power source can supply power when the mobile terminal is turned on, and at the same time ensure that power can be supplied to the encryption chip effectively when the software of the mobile terminal is cracked. In addition, the power source does not depend on the software of the mobile terminal to supply power for the mobile terminal. Generally, the power source may be a battery or a supply power which supplies power for the Flash.

Step 102: when the mobile terminal is turned on, whether or not the encryption chip is invalid is detected. When the encryption chip is invalid, Step 103 is executed; when the encryption chip is not invalid, Step 104 is executed.

In this step, in the operation of detecting whether or not the encryption chip is invalid generally is that the main chip determines whether or not the encryption chip is invalid according to whether or not information sent by the encryption chip is received in a set period of time. If the information is received, it indicates that the encryption chip is not invalid. If the information is not received, it indicates that the encryption chip is invalid. The information sent by the encryption chip can be predetermined information which determines that the encryption chip is not invalid; here, the set period of time can be a predetermined fixed period of time, which can be 10 seconds or 30 seconds, etc.

Or a changing period of a status of a GPIO interface of the encryption chip is preset, the encryption chip, according to the period, sets its own GPIO interface high or low. The main chip reads the status of the GPIO interface of the encryption chip and determines whether or not the encryption chip is invalid. When the status of the GPIO interface changes according to the preset period, it indicates that the encryption chip is not invalid; When the status of the GPIO interface does not change according to the preset period, it indicates that the encryption chip is invalid.

Before executing this step, a step in Step 104 that the encryption chip sends a secret key configured to authenticate the software of the mobile terminal to the main chip, may be executed. The main chip, according to whether or not the secret key configured to authenticate the software of the mobile terminal is received in a set period of time, determines whether or not the encryption chip is invalid; if the secret key is received, the encryption chip is determined to be not invalid; if the secret key is not received, the encryption chip is determined to be invalid.

Step 103: a functional module of the mobile terminal is protected and controlled by software, then the flow ends;

specifically, the main chip of the mobile terminal turns off a network service port, and/or an LCD port, and/or an audio functional port, and/or a keyboard response port, and etc. through the software of the mobile terminal, to make the functional module such as a network service module, and/or an LCD module, and/or an audio functional module, and/or a keyboard module, and etc. of the mobile terminal invalid.

Step 104: the encryption chip authenticates the software of the mobile terminal through interaction with the main chip; when the authentication is not passed, the functional module of the mobile terminal is protected and controlled by hardware;

specifically, when the main chip of the mobile terminal, according to the received information which determines that the encryption chip is not invalid, determines that the encryption chip is not invalid, it sends a detection passed message to the encryption chip. After receiving the detection passed message, the encryption chip sends a secret key configured to authenticate the software of the mobile terminal to the main chip. After receiving the secret key, the main chip searches in itself a secret key matched with said secret key. When the secret key matched with said secret key is found, it indicates that the version of the software of the mobile terminal in the main chip is not changed or the software of the mobile terminal in the main chip is not cracked, and the matched secret key or an authentication passed message is returned to the encryption chip; when the secret key matched with said secret key is not found or not searched, it indicates that the version of the software of the mobile terminal in the main chip has been changed or the software of the mobile terminal in the main chip has been cracked, and an authentication failure message is returned or the matched secret key is not returned to the encryption chip. When the encryption chip, in a set period of time, receives the authentication failure message or does not receive the matched secret key, it indicates that the authentication is not passed and the encryption chip controls an analog switch in a hardware protection circuit through a control line to turn off a Flash, and/or lock a keyboard, and/or turn off an LCD, and/or turn off an audio function, and/or turn off an SIM card access, and etc. The detection of a matched secret key includes a decryption operation and a matching operation performed during the application of the TDES algorithm. When the authentication passed message or the matched secret key is received, the authentication is passed and the mobile terminal works normally;

the detection passed message is a predetermined message indicating that the encryption chip is valid;

generally, the set period of time is 5 seconds, or 10 seconds, etc.

When the main chip of the mobile terminal, according to the secret key sent by the encryption chip and configured to authenticate the software of the mobile terminal, determines that the encryption chip is not invalid, searches in the main chip itself a secret key matched with said secret key. When the matched secret key is found, it indicates that the version of the software of the mobile terminal in the main chip is not changed or the software of the mobile terminal in the main chip is not cracked, and the matched secret key or an authentication passed message is returned to the encryption chip; when the secret key matched with said secret key is not found or not searched, it indicates that the version of the software of the mobile terminal in the main chip has been changed or the software of the mobile terminal in the main chip has been cracked, and an authentication failure message is returned or a matched secret key is not returned to the encryption chip. When the encryption chip, in a set period of time, receives the authentication failure message or does not receive the matched secret key, it indicates that the authentication is not passed and the encryption chip controls the analog switch in the hardware protection circuit through a control line to turn off the Flash, and/or lock the keyboard, and/or turn off the LCD, and/or turn off the audio function, and/or turn off the SIM card access, etc. When the authentication passed message or the matched secret key is received, it indicates that the authentication is passed and the mobile terminal works normally;

if a changing period of a status of a GPIO interface of the main chip of the mobile terminal is preset, the main chip according to the period, sets its own GPIO interface high or low. After the main chip determines that the encryption chip is not invalid, a detection passed message is sent to the encryption chip. After receiving the detection passed message, the encryption chip reads the status of the GPIO interface of the main chip. When the status of the GPIO interface changes according to the preset period, it indicates that the authentication is passed, and the mobile terminal works normally. When the status of the GPIO interface does not change according to the preset period, it indicates that the authentication is not passed, and the encryption chip controls the analog switch in the hardware protection circuit through a control line to turn off the Flash, and/or lock the keyboard, and/or turn off the LCD, and/or turn off the audio function, and/or turn off the SIM card access, etc.

The method above further includes: a timer is set in the encryption chip; the timer starts timing again each time the timer times out; and whether or not the encryption chip is invalid is detected over again and the software of the mobile terminal is authenticated again.

Figure 3:
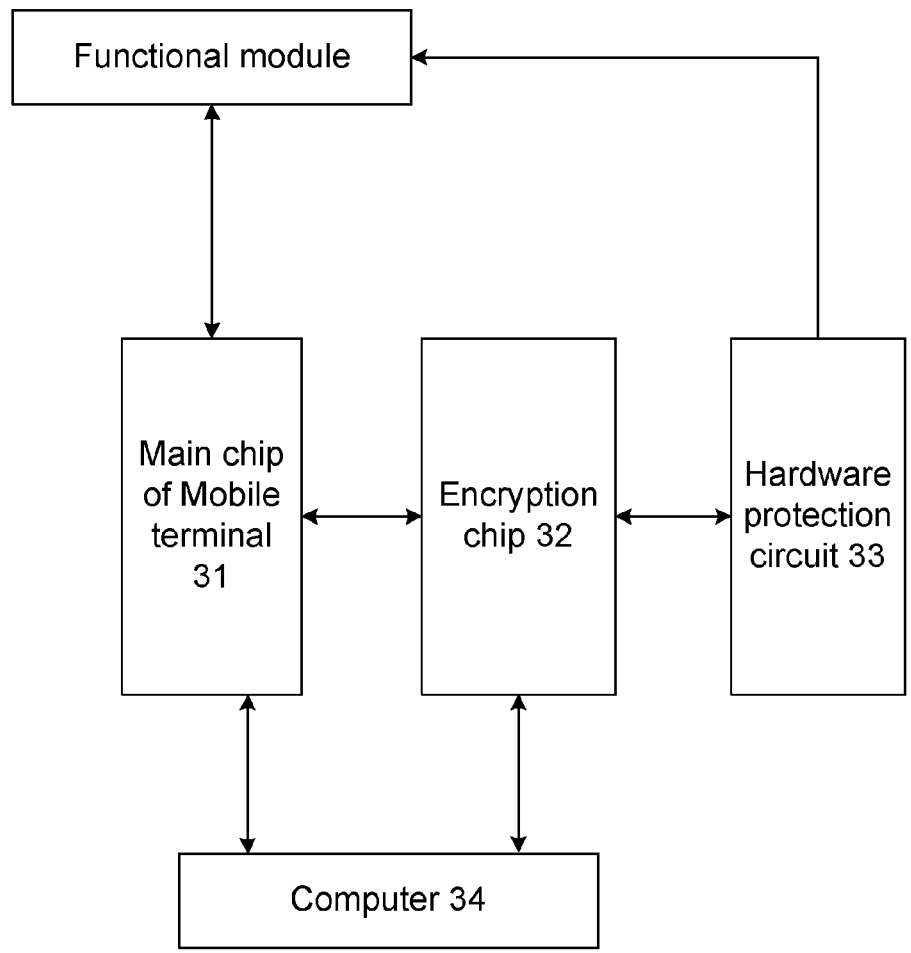
FIG. 3 is a structural diagram of realization of an apparatus for protecting software of mobile terminal in the disclosure.

In order to achieve the method above, the disclosure further provides an apparatus for protecting software of a mobile terminal. As shown in FIG. 3, the apparatus includes: a main chip 31 of the mobile terminal, an encryption chip 32 and a hardware protection circuit 33; wherein the main chip 31 of the mobile terminal is configured to, when the mobile terminal is turned on, detect whether or not the encryption chip 32 is invalid, interact with the encryption chip 32 when the encryption chip is not invalid, and authenticate the software of the mobile terminal;

the encryption chip 32 is configured to interact with the main chip 31 of the mobile terminal, authenticate the software of the mobile terminal, and notify the hardware protection circuit 33 to control a functional module of the mobile terminal when the authentication is not passed;

the hardware protection circuit 33 is configured to, according to the notification from the encryption chip 32, control the functional module of the mobile terminal;

specifically, the hardware protection circuit 33 includes a control line and an analog switch. The analog switch is set on a key signal line of the functional module of the mobile terminal. The control line is configured to transmit a control signal which is used by the encryption chip to control the analog switch. Here, the encryption chip can control the on/off of the analog switch through the control line to realize on/off control of the functional module of the mobile terminal and protect the functions of the mobile terminal. The functional module of the mobile terminal includes: a Flash, and/or a LCD module, and/or a keyboard module, and/or an audio module, and/or an SIM card module, and etc.

The main chip 31 of the mobile terminal detects whether or not the encryption chip 32 is invalid. Generally, the main chip 31 of the mobile terminal determines whether or not the encryption chip 32 is invalid according to whether or not information sent by the encryption chip 32 is received in a set period of time. If the information is received, the encryption chip is determined not to be invalid; if the information is not received, the encryption chip is determined to be invalid. The information sent by the encryption chip 32 can be predetermined information which determines that the encryption chip 32 is not invalid;

accordingly, the encryption chip 32 is further configured to send the predetermined information which determines that the encryption chip is not invalid to the main chip 31 of the mobile terminal.

The information which determines that the encryption chip 32 is not invalid can be a secret key sent by the encryption chip 32 and configured to authenticate the software of the mobile terminal;

or a changing period of a status of a GPIO interface of the encryption chip 32 is preset; the encryption chip 32, according to the period, sets its own GPIO interface high or low. The main chip 31 of the mobile terminal, according to a read status of the GPIO interface of the encryption chip 32, determines whether or not the encryption chip is invalid. When the status of the GPIO interface changes according to the preset period, the encryption chip is determined not invalid; when the status of the GPIO interface does not change according to the preset period, the encryption chip is determined invalid.

The main chip 31 of the mobile terminal is further configured to protect and control a functional module of the mobile terminal through software when the encryption chip 32 is detected to be invalid;

the main chip 31 of the mobile terminal protects and controls the functional module of the mobile terminal through software, specifically including: the main chip 31 of the mobile terminal turns off a network service port, and/or an LCD port, and/or an audio functional port, and/or a keyboard response port, and etc. through the software of the mobile terminal, to make the functional module such as a network service module, and/or an LCD module, and/or an audio functional module, and/or a keyboard module, and etc. of the mobile terminal invalid.

The encryption chip 32 interacts with the main chip 31 of the mobile terminal to authenticate the software of the mobile terminal, specifically including: the encryption chip 32 sends a secret key configured to authenticate the software of the mobile terminal to the main chip 31 of the mobile terminal; when the encryption chip 32 receives an authentication failure message or does not receive a matched secret key sent by the main chip 31 of the mobile terminal in a set period of time, it indicates that the authentication is not passed; when an authentication passed message or the matched secret key is received, it indicates that the authentication is passed;

accordingly, the main chip 31 of the mobile terminal is further configure to, after receiving the secret key configured to authenticate the software of the mobile terminal from the encryption chip 32, search in the main chip itself a secret key matched with said secret key. When the secret key matched with said secret key is found, it indicates that the version of the software of the mobile terminal in the main chip 31 of the mobile terminal is not changed or the software of the mobile terminal in the main chip 31 is not cracked, and the matched secret key or an authentication passed message is returned to the encryption chip 32. When the secret key matched with said secret key is not found or not searched, it indicates that the version of the software of the mobile terminal in the main chip 31 of the mobile terminal has been changed or the software of the mobile terminal in the main chip 31 has been cracked, and an authentication failure message is returned or a matched secret key is not returned to the encryption chip 32;

or the encryption chip 32 reads a status of a GPIO interface of the main chip 31 of the mobile terminal; when the status of the GPIO interface changes according to a preset period, it indicates that the authentication is passed; the status of the GPIO interface does not change according to the preset period, it indicates that the authentication is not passed;

accordingly, the main chip 31 of the mobile terminal is further configured to preset a changing period of the status of the GPIO interface, and sets its own GPIO high or low according to the period.

Further, the apparatus further includes a computer 34 configured to set secret keys matched with each other in the encryption chip 32 and in the main chip 31 of the mobile terminal, respectively;

specifically, the computer 34 reads a Flash ID, and/or an IMEI, and/or an encryption chip serial number, and etc., and combines the Flash ID, and/or the IMEI, and/or the encryption chip serial number to produce "one computer one code" secret keys. The produced secret keys are saved in the encryption chip 32 and in the main chip 31 of the mobile terminal respectively, as matched secret keys for communication handshaking. Generally, the Flash ID, and/or the IMEI, and/or the encryption chip serial number, and etc. are combined by addition processing, or exclusive-or processing;

or the computer 34 sets a TDES algorithm to be applied between the encryption chip 32 and the main chip 31 mobile terminal, predetermines a 16-byte authentication key saved in the encryption chip 32 and in the main chip 31 of the mobile terminal respectively;

accordingly, when the encryption chip 32 sends a secret key configured to authenticate the software of the mobile terminal, the following steps are included:

encryption operation: performing 3DES operation on KEY and RAND to obtain an eight-byte result R, i.e. R=KEY⊕RAND; forming command data (CHV value): CHV value=R; sending a verification command and the RAND: sending the verification command (a0 20 00 01 08 R) and the RAND to the mobile terminal;

accordingly, when the main chip 31 of the mobile terminal obtains the verification command and the RAND, the following steps are performed:

decryption operation: performing 3DES decryption operation on the KEY and the R to obtain an eight-byte result RN, i.e. RN=Key⊕R, the obtained RN is a decryption result; performing matching operation: RAND=RN, indicating it is correct, and returning SW1SW2="authentication passed"; otherwise, returning SW1SW2="authentication not passed", or not returning a value in a predetermined period of time;

further, the computer 34 is further configured to, before reading the Flash ID, and/or the IMEI, and/or the encryption chip serial number, etc. or setting application of the TDES algorithm, perform softdog authentication; after the authentication is passed, read the Flash ID, and/or the IMEI, and/or the encryption chip serial number, and etc. or set the TDES algorithm to be applied.

Further, the encryption chip 32 is further configured to set a timer. The timer starts timing again each time the timer times out, and triggers the main chip 31 of the mobile terminal and the encryption chip 32 to detect again whether the encryption chip is invalid and authenticate the software of the mobile terminal again.

The method of the disclosure can protect the functions of the mobile terminal from illegal usage when the encryption chip is cracked or dismantled. In addition, when the authentication performed by the encryption chip on the software of the mobile terminal is not passed, the hardware protection circuit is started to control a functional module of the mobile terminal. In this way, the software of the mobile terminal can be better prevented from being cracked, thus the security of the mobile terminal is greatly improved and the interests of operators and manufacturers are protected.

The above is only the preferred embodiment of the disclosure and not intended to limit the scope of protection of the disclosure, and any modifications, equivalent replacements, improvements or the like within the spirit and principle of the invention shall fall within the scope of protection of the disclosure.

The invention claimed is:

1. A method for protecting software of a mobile terminal, comprising:
   when the mobile terminal is turned on, detecting whether or not an encryption chip is invalid, wherein the encryption chip is mounted in the mobile terminal and information in the encryption chip cannot be modified by a main chip of the mobile terminal;
   when the encryption chip is not invalid, authenticating, by the encryption chip, the software of the mobile terminal through interaction with the main chip; and when the authentication is not passed, controlling, by the encryption chip, a functional module of the mobile terminal through a hardware protection circuit;
   wherein the authenticating, by the encryption chip, the software of the mobile terminal through interaction with a main chip comprises: sending, by the encryption chip, a secret key configured to authenticate the software of the mobile terminal to the main chip; after the main chip receives said secret key, searching, by the main chip, a secret key matched with said secret key in the main chip itself; returning, by the main chip, the matched secret key or an authentication passed message to the encryption chip when the secret key matched with said secret key is found; and returning, by the main chip, an authentication failure message or not returning the matched secret key to the encryption chip when the secret key matched with said secret key is not found or not searched;
   when the encryption chip receives the authentication failure message or does not receive the matched secret key in a set period of time, then indicating that the authentication is not passed; when the encryption chip receives the authentication passed message or the matched secret key, indicating that the authentication is passed; wherein the secret key configured to authenticate the software of the mobile terminal and the secret key matched with said secret key are secret keys matched with each other and are respectively preset by a computer in the encryption chip and in the main chip;
   or reading, by the encryption chip, a status of a GPIO interface of the main chip; when the status of the GPIO interface changes according to a preset period, indicating that the authentication is passed; when the status of the GPIO interface does not change according to the preset period, indicating that the authentication is not passed.

2. The method according to claim 1, wherein the detecting whether or not the encryption chip is invalid comprises: determining, by the main chip, whether or not the encryption chip is invalid according to whether or not information sent by the encryption chip is received in a set period of time; if the information is received, determining that the encryption chip is not invalid; otherwise, determining that the encryption chip is invalid;
   or reading, by the main chip, a status of a General Purpose Input Output (GPIO) interface of the encryption chip, and determining, by the main chip, whether or not the encryption chip is invalid; when the status of the GPIO interface changes according to a preset period, determining that the encryption chip is not invalid; when the status of the GPIO interface does not change according to a preset period, determining that the encryption chip is invalid;
   or determining, by the main chip, whether or not the encryption chip is invalid according to whether or not a secret key configured to authenticate the software of the mobile terminal is received in a set period of time is received; if the secret key is received, then determining that the encryption chip is not invalid; otherwise, determining that the encryption chip is invalid.

3. The method according to claim 1, wherein the controlling, by the encryption chip, a functional module of the mobile terminal through a hardware protection circuit comprises: controlling, by the encryption chip, an analog switch in the hardware protection circuit through a control line to turn off a Flash, and/or lock a keyboard, and/or turn off a Liquid Crystal Display (LCD), and/or turn off an audio function, and/or turn off a Subscriber Identity Module (SIM) card access.

4. The method according to claim 1, further comprising: when the encryption chip is detected to be invalid, protecting and controlling the functional module of the mobile terminal through software.

5. The method according to claim 4, wherein the protecting and controlling the functional module of the mobile terminal through software comprises: turning off, by the main chip of the mobile terminal, a network service port, and/or an LCD port, and/or an audio functional port, and/or a keyboard response port through the software of the mobile terminal.

6. The method according to claim 1, further comprising: setting a timer in the encryption chip; starting timing again each time the timer times out; and detecting again whether or not the encryption chip is invalid and authenticating the software of the mobile terminal again.

7. An apparatus for protecting software of a mobile terminal, comprising a main chip of the mobile terminal, an encryption chip and a hardware protection circuit; wherein
   the main chip of the mobile terminal is configured to, when the mobile terminal is turned on, detect whether or not the encryption chip is invalid, interact with the encryption chip when the encryption chip is not invalid, and authenticate the software of the mobile terminal;

the encryption chip is configured to interact with the main chip of the mobile terminal, authenticate the software of the mobile terminal, and notify the hardware protection circuit to control a functional module of the mobile terminal when the authentication is not passed, wherein the encryption chip is mounted in the mobile terminal and information in the encryption chip cannot be modified by the main chip of the mobile terminal; and the hardware protection circuit is configured to, according to the notification from the encryption chip, control the functional module of the mobile terminal;

wherein the encryption chip is configured to send a secret key configured to authenticate the software of the mobile terminal to the main chip of the mobile terminal; wherein when the encryption chip, in a set period of time, receives an authentication failure message or does not receive a matched secret key sent by the main chip of the mobile terminal, it indicates that the authentication is not passed; when the encryption chip receives an authentication passed message or the matched secret key, it indicates that the authentication is passed;

accordingly, the main chip of the mobile terminal is further configured to, after receiving said secret key configured to authenticate the software of the mobile terminal from the encryption chip, search a secret key matched with said secret key in the main chip itself; return the matched secret key or an authentication passed message to the encryption chip when the secret key matched with said secret key is found; and return an authentication failure message or not return the matched secret key to the encryption chip when the secret key matched with said secret key is not found or not searched;

accordingly, the apparatus further comprises a computer configured to set secret keys matched with each other in the encryption chip and in the main chip of the mobile terminal, respectively;

or, the encryption chip is configured to read a status of a GPIO interface of the encryption chip; wherein when the status of the GPIO interface changes according to a preset period, it indicates that the authentication is passed; when the status of the GPIO interface does not change according to the preset period, it indicates that the authentication is not passed;

accordingly, the main chip of the mobile terminal is further configured to preset a changing period of the status of the GPIO interface, and sets its own GPIO high or low according to the period.

8. The apparatus according to claim 7, wherein the main chip of the mobile terminal is configured to, according to whether or not information sent by the encryption chip is received in a set period of time, determine whether or not the encryption chip is invalid; if the information is received, determine the encryption chip is not invalid; if the information is not received, determine the encryption chip is invalid; accordingly, the encryption chip is further configured to send predetermined information which determines that the encryption chip is not invalid to the main chip of the mobile terminal;

or the main chip of the mobile terminal is configured to, according to a read status of a General Purpose Input Output (GPIO) interface of the encryption chip, determine whether or not the encryption chip is invalid; when the status of the GPIO interface changes according to a preset period, determine the encryption chip is not invalid; when the status of the GPIO interface does not change according to the preset period, determine the encryption chip is invalid.

9. The apparatus according to claim 7, wherein the hardware protection circuit comprises a control line and an analog switch; wherein the analog switch is set on a signal line of the functional module of the mobile terminal; and the control line is configured to transmit a control signal which is used by the encryption chip to control the analog switch; and the functional module of the mobile terminal comprises: a Flash, and/or a Liquid Crystal Display (LCD) module, and/or a keyboard module, and/or an audio module, and/or a Subscriber Identity Module (SIM) card module.

10. The apparatus according to claim 7, wherein the main chip of the mobile terminal is further configured to, when the encryption chip is detected to be invalid, protect and control the functional module of the mobile terminal through software;

wherein the protecting and controlling the functional module of the mobile terminal through software comprises: turning off a network service port, and/or an LCD port, and/or an audio functional port, and/or a keyboard response port through the software of the mobile terminal.

11. The apparatus according to claim 7, wherein the encryption chip is further configured to set a timer; wherein the timer starts timing again each time the timer times out, and triggers the main chip of the mobile terminal and the encryption chip to detect again whether the encryption chip is invalid and authenticate the software of the mobile terminal again.

12. The method according to claim 2, further comprising: setting a timer in the encryption chip; starting timing again each time the timer times out; and detecting again whether or not the encryption chip is invalid and authenticating the software of the mobile terminal again.

13. The method according to claim 3, further comprising: setting a timer in the encryption chip; starting timing again each time the timer times out; and detecting again whether or not the encryption chip is invalid and authenticating the software of the mobile terminal again.

14. The method according to claim 4, further comprising: setting a timer in the encryption chip; starting timing again each time the timer times out; and detecting again whether or not the encryption chip is invalid and authenticating the software of the mobile terminal again.

15. The method according to claim 5, further comprising: setting a timer in the encryption chip; starting timing again each time the timer times out; and detecting again whether or not the encryption chip is invalid and authenticating the software of the mobile terminal again.

16. The apparatus according to claim 8, wherein the encryption chip is further configured to set a timer; wherein the timer starts timing again each time the timer times out, and triggers the main chip of the mobile terminal and the encryption chip to detect again whether the encryption chip is invalid and authenticate the software of the mobile terminal again.

17. The apparatus according to claim 9, wherein the encryption chip is further configured to set a timer; wherein the timer starts timing again each time the timer times out, and triggers the main chip of the mobile terminal and the encryption chip to detect again whether the encryption chip is invalid and authenticate the software of the mobile terminal again.

18. The apparatus according to claim 10, wherein the encryption chip is further configured to set a timer; wherein the timer starts timing again each time the timer times out, and triggers the main chip of the mobile terminal and the encryption chip to detect again whether the encryption chip is invalid and authenticate the software of the mobile terminal again.

* * * * *

UNITED STATES PATENT AND TRADEMARK OFFICE
CERTIFICATE OF CORRECTION

| | | |
|---|---|---|
| PATENT NO. | : 8,751,824 B2 | Page 1 of 1 |
| APPLICATION NO. | : 13/640558 | |
| DATED | : June 10, 2014 | |
| INVENTOR(S) | : Lin | |

It is certified that error appears in the above-identified patent and that said Letters Patent is hereby corrected as shown below:

Title Page, please delete:
Item "(74) Attorney, Agent, or Firm- Oppendahl Patent Law Firm LLC"

And insert the following correction:
Item -- (74) Attorney, Agent, or Firm- Oppedahl Patent Law Firm LLC --

Signed and Sealed this
Twenty-third Day of September, 2014

Michelle K. Lee
*Deputy Director of the United States Patent and Trademark Office*